July 7, 1931.　　　W. V. FOLEY　　　1,813,797
METHOD OF MAKING RUBBER HANDLED TOOLS
Filed April 27, 1928　　2 Sheets-Sheet 1
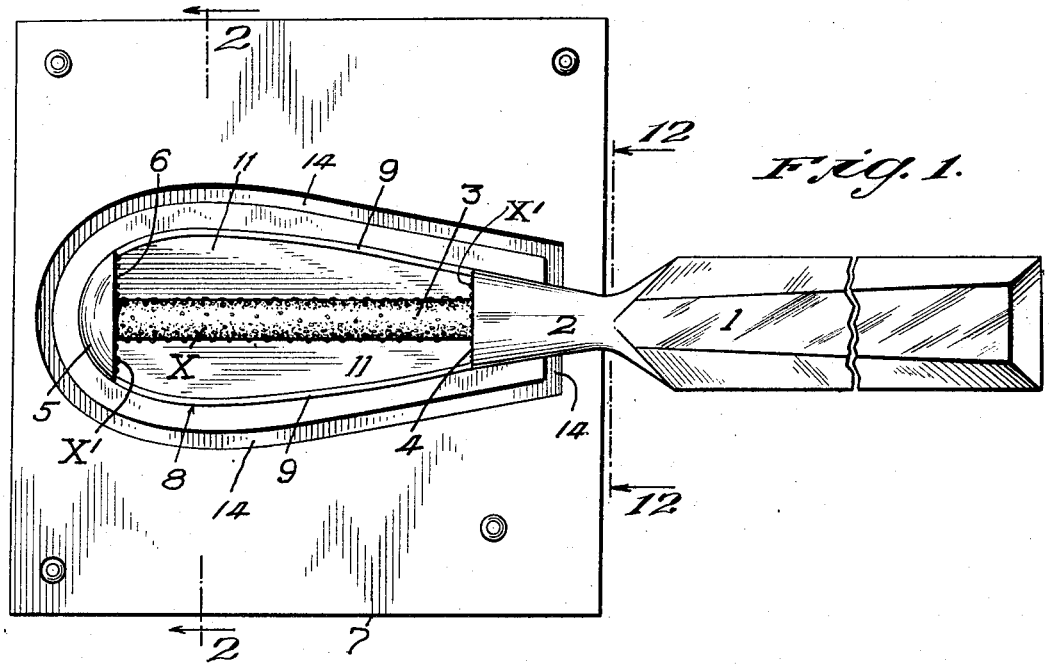
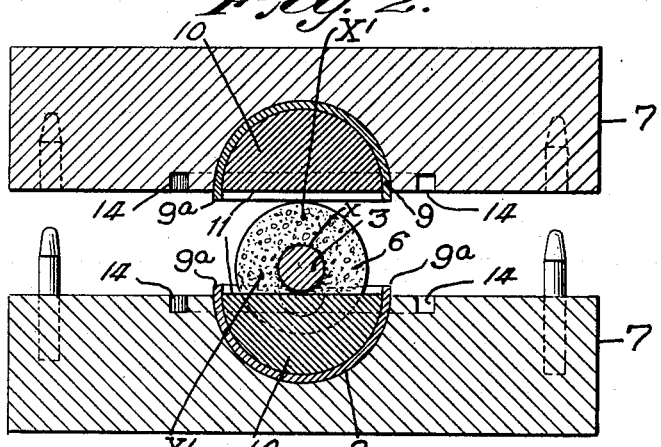
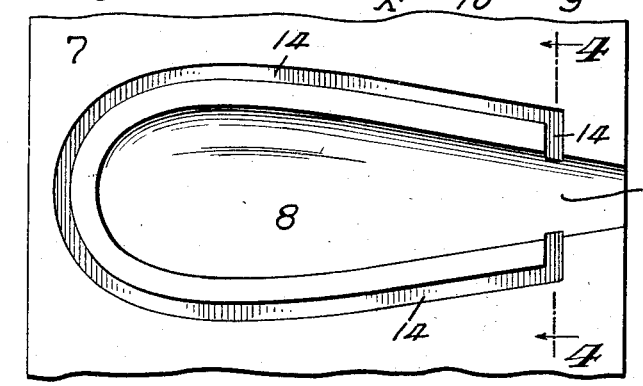
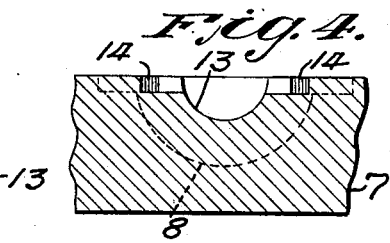
INVENTOR
William Findlach Foley
BY
ATTORNEY July 7, 1931. W. V. FOLEY 1,813,797
METHOD OF MAKING RUBBER HANDLED TOOLS
Filed April 27, 1928 2 Sheets-Sheet 2
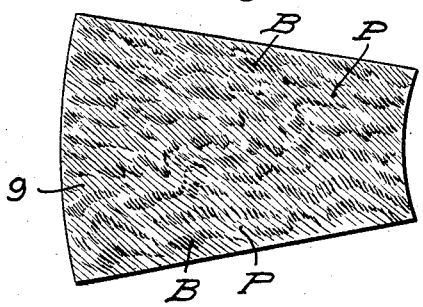
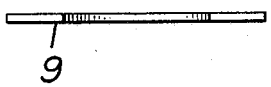
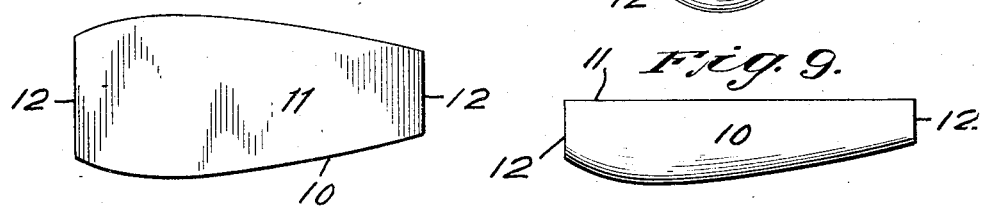
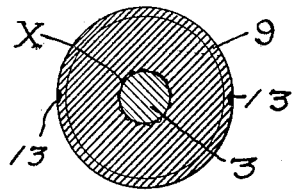
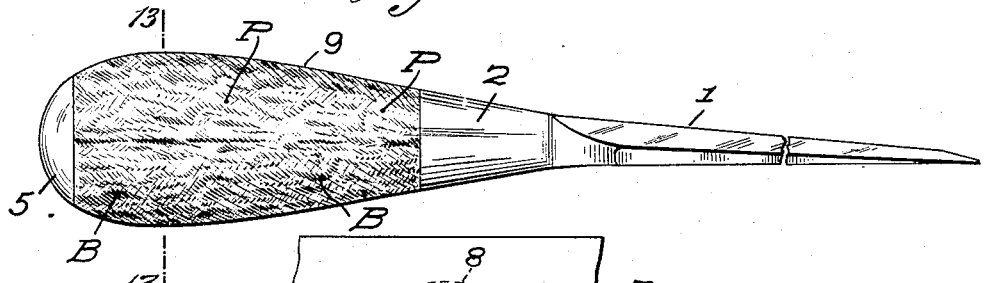
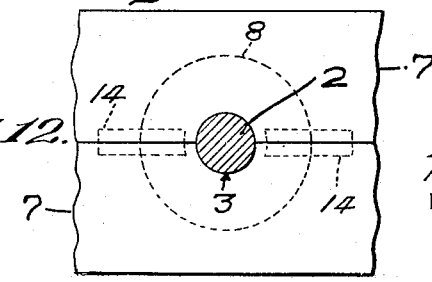
INVENTOR
William Vincent Foley
BY
Edmund S. Beach
ATTORNEY Patented July 7, 1931

1,813,797

UNITED STATES PATENT OFFICE

WILLIAM VINCENT FOLEY, OF NEW HAVEN, CONNECTICUT, ASSIGNOR OF ONE-HALF TO EDWARD S. BEACH, OF RIDGEFIELD, CONNECTICUT

METHOD OF MAKING RUBBER-HANDLED TOOLS

Application filed April 27, 1928. Serial No. 273,212.

This invention relates to rubber handled tools: method and product. The main object of this invention is to provide a particular class of metal tools with shock absorbing, dent resisting hard rubber handles of bulbous shape. The metal tools in question having, in addition to a tool receiving bar one end of which terminates in a butt end enlargement or so-called button, and the other end of which terminates in a shoulder at the butt end of the shank. The bulbous shaped shock absorbing handles embodying this invention are covered with a pigmented veneer which may be mottled and thereby made to imitate a wood color and grain.

Pigmented rubber compound is so expensive that in quantity production of rubber handled implements, the use of rubber handle forming compound containing color pigment throughout it would be economically prohibitive.

In the accompanying drawings forming a part hereof and illustrating my invention, Fig. 1 is a face plan view of one of a pair of complementary handle forming molds with one of a pair of preformed rubber handle cores, and one of a pair of pigmented rubber veneer sheets, assembled in the mold cavity with a two-shouldered metal tool such as above referred to;

Fig. 2 is a cross-sectional view at a line corresponding to line 2—2 of Fig. 1, of the pair of complementary molds carrying the assemblage shown in Fig. 1; the upper mold carrying a complementary rubber core and rubber veneer;

Fig. 3 is a face plan view of either of the two complementary molds;

Fig. 4 is a cross-section of either mold, at a line corresponding to line 4—4 of Fig. 3, and shows the mold cavity provided with a semi-circular end opening;

Fig. 5 is a plan view of one of a pair of pigmented, uncured rubber veneer sheets having convergent long edges and slightly curved ends;

Fig. 6 is an end view of what is shown in Fig. 5;

Fig. 7 is a plan view of the inward flat face of one of a pair of preformed, uncured rubber handle cores;

Fig. 8 is a view of the smaller end of what is shown in Fig. 7;

Fig. 9 is a side elevation of what is shown in Fig. 7;

Fig. 10 is a butt end view of what is shown in Fig. 7;

Fig. 11 is an elevation of a tool having a completed handle;

Fig. 12 is an elevation of the complementary molds closed on the assemblages shown in Fig. 2, the tool shank being in cross-section at line 12—12 of Fig. 1; and Fig. 13 is a cross-section, at line 13—13 of Fig. 11, looking towards the tool shank, of the completed handle.

In the drawings, the blade like tool forming portion or extension of the metal structure to be provided with a rubber handle is indicated by 1. This portion of the metal structure may be of various shapes and dimensions, adapted for any purpose desired; such as a chisel, screwdriver, file or knife, etc., for examples:

Said portion is formed with a shank 2 which is generally cross-sectionally round and tapered towards member 1. The shank has a handle receiving portion 3 which is usually round in cross-section, and the axis of which is in alinement with the axis of shank 2; the cross-section of portion 3 is of smaller dimension than the cross-section of the outward end of shank 2 where a flat shoulder 4 extends around the handle receiving bar 3; the latter terminating in a butt end enlargement or so-called button 5 rounded on its outward surface. The forward face of the button forms a shoulder 6 around bar 3. Such metal structures are old.

In practicing my invention, a pair of complementary molds 7 are employed. Each mold is formed with an elongated, cross-sectionally half round cavity 8, shaped and approximately dimensioned so that the two cavities correspond to the shape and dimensions of the bulbous handle.

The rubber veneers are indicated by 9 and are punched or died out from pigmented, uncured rubber sheets.

The preformed, uncured rubber cores, shown in Figs. 7 to 10, inclusive, are indicated by 10. Each core has a flat face 11, being otherwise semi-circular in cross-section. Their ends 12 are flat. These cores are preformed in suitable dies, not shown, out of what is known in the rubber trade as uncured black rubber compound. They are un-pigmented and constitute the greater portion of the hard rubber handles with which the implements are provided.

The cores 10 are preferably made of a rubber compound having about 5,000 pounds tensile strength per square inch, and about 6% elongation per square inch, which compound is commonly known as Navy specification stock.

The veneers 9 are made from pigmented rubber compound having preferably about 5,000 pounds tensile strength per square inch and about 4% elongation per square inch. It is preferred to have the veneers of a lesser percentage of elongation than the cores because the cores, in case of bending strains on the handles, have to endure a greater distortion than the veneering; and the veneering has to withstand exterior blows tending to bruise or dent it. Consequently, as the veneering compound of the lower percentage of elongation per square inch is necessarily harder than the core compound per square inch, the harder compound of the lower percentage of elongation is used for the exterior veneer covering of the handles.

In assemblage, preparatory to molding the handles (Figs. 2 and 12), a veneer 9 is manually placed in the cavity 8 of each mold, between the ends of the cavity, and pressed down against the wall of the cavity; a preformed core 10 is then manually superposed on the dished veneer and pressed down against the latter. The veneers are made a little wider than required for merely lining the portion of the cavity wherein a handle is to be formed, and so that the two long margins 9$^a$ of the veneer project out of the cavity beyond the surface of the molds in which the initial assemblages are made. The thickness of each core from its flat surface 11 to the crest of its opposite curved surface is sufficient to permit the flat surface 11 to be about flush with the faces of the molds 7.

The butt end button and shank of the metal structure are then pressed down manually into the end portions of a cavity 8, at the ends of the veneer and core in one of the molds, the handle receiving bar 3 of the metal structure at the same time being pressed against or into the faces 11 of the cores. Owing to the taper of the shank in the direction of the free end of extension 1, and the corresponding taper of the walls of cavities 13 that engage the shank, the metal structure is held from endwise movement, and with its axis coincident with the axis of the mold cavities 8, during the molding operation. Molds 7 with an assemblage in each are then forced together, face to face, symmetrically in an appropriate press, and in the presence of a curing agent or means. The pressure exerted presses the two preformed plastic cores uniformly around the handle receiving bar 3 of the metal structure; the two opposed flat faces of the cores at each side of a metal bar 3 becoming joined together; the opposed edges of the projecting veneer margins 9$^a$ becoming joined together; and the rubber elements being compressed on and solidly united around the metal bar 3, between the shoulder 4 of the metal structure and the flat inner face or shoulder 6 of the butt end button.

The compression of the plastic rubber elements into the space thus provided and the simultaneous curing results in tight joints where the rubber is cured against the shoulders 4 and 6; and also a perfectly symmetrical disposition of the exterior surface of the mottled veneer relatively to the axis of the handle is obtained. At the same time the veneer compound and the core compound are perfectly united.

Each member of the mold is provided with an overflow channel 14 for reception of excess rubber, in a well known way.

A visible result of the molding operation is that while the meeting edges of the long margins 9$^a$ of the veneering are perfectly united together, yet along the diametrically opposite sides of the handle, outwardly visible, thin irregular lines 15 are formed, after any fins formed by the compression of rubber elements have been removed and the rubber handle has been subjected to a finishing operation. It is found that no two handles are alike in respect to the exterior visible seams 15 and such differences are of practical service to workmen in identifying each his own tool.

Cavity 8 of each mold has a semi-circular opening 13 that receives the tool shank 2; and when the complementary molds are pressed together during the handle molding and curing operation, the tool shank is gripped by the walls of opening 13, thereby preventnig movement of the assemblage being molded and a consequent unsymmetrical product.

In practical and successful manufacture of the rubber handled tools above mentioned, it is necessary that the black uncured rubber compound of the cores be not forced by the molding pressure through the pigmented uncured veneers, and thus prevent the desired coloration or mottling. To insure the desired coloration or mottling, I preform black rubber stock into the cores 10 each of which is of the same length as the space between the shoulders 4 and 6, but of a slightly lesser widthwise dimension, as will be found by comparative measurements of the cores as they are shown in Figs. 1 and 7.

If the cores are of the full size of the mold cavities, then when an assemblage is compressed in the molds, in a molding press as usual, it results in portions of the black stock, in the cured outer surfaces of the cores, being pushed through the thin opposed walls of the veneers and impairing the mottling.

When the handle receiving bar 3 of the metal tool structure is pressed, on closure of the molds 7 (Fig. 2), into the upper flat faces of the black cores, there is such a displacement of the compound in the cores that the cores, though widthwise, initially-narrower than where they are when cured, fully fill the mold cavities 8 and have their flat surfaces 11, at each side of bar 3 compressed homogeneously rather than jointedly together; the molding pressure simultaneously uniting the opposed walls of the veneers and cores homogeneously rather than jointedly and expanding and curing the rubber components of the handle lengthwise into the tightest possible joint forming relations with the shoulders 4 and 6.

The handle bar 3 is not smoothed after fabrication but is left rough. Its inequalities are indicated at X. The rubber cores, when compressed in place during the molding operation, accordingly interlock with the approximately hill and dale irregularities of the rough surfaces of the bar. The faces of the shoulders are likewise left rough. Their comparable surface irregularities are indicated at X¹. The lengthwise expansion of the cores causes the core ends to interlock with the irregularities of the shoulder faces.

The veneers, as shown, are sectors, such as would be formed by dividing a disk having a centre hole into a plurality of sections, the long edges of the veneers corresponding to lines radial to the centre of the disk.

The pigmentation or colors in the veneer are indicated by P. It is noted that the coloring matter or pigment is mixed with so-called black stock which is indicated by B in the veneers. The pigment in the veneers may not very perfectly or not at all unite with the black rubber of the cores, but there is sufficient black stock exposed on the inward surfaces of the veneers to insure a positive union of the black compound of the veneers with the black compound of the cores to prevent the veneers from moving or turning on the cores. During the mottling operation of the pigmented plastic rubber compound, the latter is stirred, bringing some of the black compound into the surfaces of the veneers on both sides.

If the cores were semi-cured prior to assemblage, they would still be plastic, but not so efficient as they are when uncured.

I have described the main object of my invention as relating to bulbous handled tools. That is its main present object, but it may be that there are other articles of manufacture in which the invention may be practically and economically embodied; and I intend some of my claims broadly to cover any article of manufacture embodying the invention. The cores are preformed into their semi-bulbous form in order to insure symmetry of the handle. The metal bars 3 when the molds close together not only have the cores pressed on them but also cause the cores to expand outwardly toward the faces of the molds, as well as to expand lengthwise and widthwise. The bars 3 therefore perform a molding function additional to the functions of molds 7.

What I claim is:

1. The herein described method of making rubber handled tools, consisting in inserting veneers of a curable relatively hard rubber compound into the cavity of each of a plurality of complementary molds in which the cavity has a butt-end portion and an opening at the other end; placing within each veneer lining a complementary core-forming member of curable rubber compound softer than the veneer compound, bringing the charged complementary molds together with a metal bar between them having a shank fitting the said openings of said molds, said bar being located between the complementary core-forming members; compressing the charged molds together so that the material of the core-forming members is displaced by said bar and the members are caused to surround said bar and to be brought into contact with one another, while displacing and then compressing the material of the core members solidly onto and around said bar; and curing the rubber under compression in the molds.

2. The herein described method of making rubber handled tools, consisting in inserting veneers of a curable relatively hard rubber compound into the semi-bulbous cavity of each of a pair of complementary molds in which the cavity has an enlarged butt-end and tapers toward an opening at the shank end, which opening serves for receiving the metal shank of the tool, with the veneers lining the middle portions of the molds; placing within each veneer lining a semi-bulbous core forming member of curable rubber compound softer than the veneer compound, said core member having a substantially flat face substantially flush with the face of the mold; bringing the charged complementary molds together with a metal tool handle between them and having a shank fitting the said openings of said molds and reduced to form a transverse shoulder within the molds, an elongated bar connected to said shank and terminating in a butt-end button, said handle being located with the button in the enlarged butt-end portion of each cavity and with the bar located between the flat faces of the core-forming members; compressing the charged molds together so that the material of the core-forming members is displaced by said bar and the members are caused to surround said bar and to be brought into contact with one another, while displacing and then compressing the material of the members solidly onto and around said bar and between the button and the transverse shoulder; and curing the rubber under compression in the molds.

3. The herein described method of making rubber handled tools consisting of inserting veneers of curable relatively hard rubber compound into the semi-bulbous cavity of each of a pair of complementary molds in which each cavity has an enlarged butt-end and tapers toward an opening at the shank end which serves for receiving the metal shank of a tool, with the veneers lining the middle portions of the molds at least to the longitudinal edges thereof at said middle portions, placing within each veneer lining a semi-bulbous core-forming member of curable rubber compound softer than the veneer compound and of a different color, said core member having a substantially flat surface substantially flush with the surface of the mold, bringing the charged complementary molds together with a metal tool handle between them having a shank fitting the said openings of said molds and reduced to form a transverse shoulder within the molds, an elongated bar connected to said shank and terminating in a butt-end button, said handle being located within the butt-end portion of each cavity and with the bar located between the flat faces of the core-forming members, compressing the charged molds together so that the material of the core-forming members is displaced by the said bar and brought into contact with one another while displacing and compressing the material of the members solidly onto and around said bar and between the butt-end button and the transverse shoulder, and forcing an excess of said material over and past the longitudinal edges of the veneer whereby to form differential coloring at said point, and in curing the rubber under compression in the mold.

Signed at New York, in the county of New York, and State of New York, this 24th day of April, A. D. 1928.

WILLIAM VINCENT FOLEY.